United States Patent
Lin et al.

(10) Patent No.: US 9,360,096 B2
(45) Date of Patent: Jun. 7, 2016

(54) BALL SCREW WITH SUPPORT DEVICES

(71) Applicant: HIWIN TECHNOLOGIES CORP., Taichung (TW)

(72) Inventors: Ying-Ju Lin, Taichung (TW); Hung-Chih Hsu, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 0 days.

(21) Appl. No.: 14/555,994

(22) Filed: Nov. 28, 2014

(65) Prior Publication Data

US 2015/0143935 A1    May 28, 2015

(30) Foreign Application Priority Data

Nov. 28, 2013    (TW) .............................. 102143413 A

(51) Int. Cl.
*F16H 25/24* (2006.01)
*F16H 25/20* (2006.01)

(52) U.S. Cl.
CPC .......... *F16H 25/24* (2013.01); *F16H 2025/204* (2013.01); *F16H 2025/2436* (2013.01); *Y10T 74/1868* (2015.01); *Y10T 74/18648* (2015.01)

(58) Field of Classification Search
CPC .............. F16H 25/24; F16H 2025/204; F16H 2025/2436
USPC ....................................................... 74/89.32
See application file for complete search history.

(56) References Cited

U.S. PATENT DOCUMENTS

| | | | | |
|---|---|---|---|---|
| 5,319,990 A | * | 6/1994 | Veale | B23Q 5/404 160/85 |
| 5,531,557 A | * | 7/1996 | Springer | B65G 69/005 188/32 |
| 5,720,202 A | * | 2/1998 | Senjo | B23Q 5/404 384/53 |
| 5,974,904 A | * | 11/1999 | Dirschbacher | B23Q 5/404 74/89.22 |

FOREIGN PATENT DOCUMENTS

| | | | | |
|---|---|---|---|---|
| DE | WO 0139923 A2 | * | 6/2001 | ............... B23Q 5/40 |
| DE | 102009005785 A1 | * | 11/2009 | ............... F16H 25/24 |

* cited by examiner

*Primary Examiner* — William Kelleher
*Assistant Examiner* — Leonard J Archuleta
(74) *Attorney, Agent, or Firm* — Muncy, Geissler, Olds & Lowe, P.C.

(57) ABSTRACT

A ball screw with support devices includes a nut base having two sides equipped with the support devices for preventing the screw from deflection. Two runner structures are provided near two ends of the screw. The runner structure includes a driving wheel and a driven wheel having different diameters and concentrically installed. The nut base is connected to the driving wheel via an active connecting element for driving the driving wheel to rotate. The driven wheel moves with the driving wheel and is connected to the support devices via passive connecting elements so that the support devices and the nut displace synchronously. By controlling a diameter ratio between the driving and driven wheels, the nut and the support devices displace with proportional speeds, thereby allowing the support devices to always stay at the two sides of the nut as designed and provide reliable support.

5 Claims, 8 Drawing Sheets

BALL SCREW WITH SUPPORT DEVICES

BACKGROUND OF THE INVENTION

1. Technical Field

The present invention relates to linear transmissions, and more particularly relates to a ball screw with support devices.

2. Description of Related Art

Generally speaking, ball screws have been extensively used for transmissions where precision is of high priority, and the length of the screw of a ball screw is increased with the travel of the transmission. However, a long screw with a large slenderness ratio tends to have gravity sag due to its own weight. Such sag can significantly degrade the precision of the transmission, and has adversely effect on the service life of the screw, thus being a problem to address.

FIG. 1 depicts a conventional ball screw 10, which primarily comprises a screw 11 and a nut 12. The nut 12 is fixed to a nut brace 13 and is mounted around the screw 11.

At two sides of the nut brace 13, support devices 14 are provided. The support device 14 comprises a bush 141 fixed to a bush seat 142 and mounted around the screw 11. The nut brace 13 and the support devices 14 are further equipped with a first pulley 15 and a second pulley 16 that drive displacement, so that when the nut brace 13 moves, the bush seats 142 are displaced simultaneously, thereby ensuring that the bush seats 142 are always well positioned at two sides of the nut brace 13 for providing support. While the first pulley 15 and the second pulley 16 do help to ensure stable displacement of the nut brace 13 and the bush seat 142 and reliable support to the screw, the overall configuration is structurally complicated and the maintenance thereof is costly.

In view of this, the inventor of the present invention has conducted extensive research, study and experiments as well as tests, and now successfully invents a ball screw equipped with novel support devices.

SUMMARY OF THE INVENTION

The present invention provides a ball screw with support devices and its primary objective is to improve the conventional ball screw by simplify the structure for synchronous displacement of the support devices and thereby reducing the maintenance costs.

For achieving the foregoing objective, the disclosed ball screw comprises:

a screw;

a nut, fixed to a nut base and mounted around the screw;

at least one support unit, including two support devices, the support device having a bush that is fixed to a bush seat and slidably mounted around the screw, and the two support devices of the support unit being symmetrically arranged at two sides of the nut base; and a speed-controlling unit, including two runner structures, an active connecting element and a plurality of passive connecting elements, the runner structure having a foundation on which a driving wheel and at least one driven wheel are rotatably and concentrically installed, the driving wheel having a diameter greater than a diameter of the driven wheel, the runner structures being deposited near two ends of the screw, the active connecting element being wound around the driving wheels of the two runner structures and having two ends thereof fixed to the nut base, and the passive connecting element having one end wound around the driven wheel, and an opposite end connected to the bush seat.

The present invention features the runner structures deposited near the two ends of the screw and including driving wheels and driven wheels structure having different diameters. The nut base drives the driving wheels to rotate through the active connecting element, and the driven wheels connected to the bush seats through the passive connecting elements drive the bush seats to move simultaneously with the driving wheels. The overall structure is simple and its maintenance is inexpensive. By controlling the diameter ratio between the driving wheel and the driven wheel, the nut base and the bush seats are set to move at proportional displacement velocities, thereby ensuring that the bush seats provide reliable support at two sides of the nut base.

DETAILED DESCRIPTION OF THE INVENTION

Figure 1:
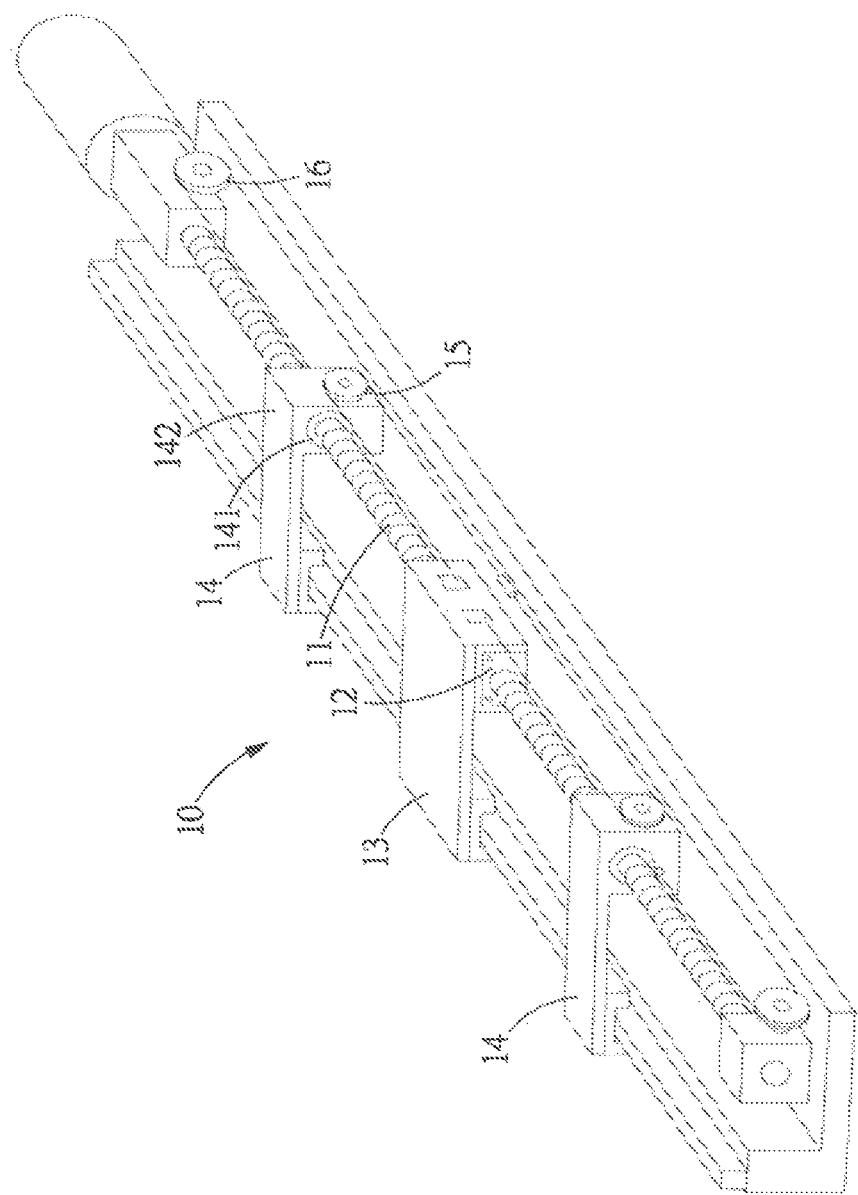
FIG. 1 depicts a conventional ball screw.

For further illustrating the means and functions by which the present invention achieves the certain objectives, the following description, in conjunction with the accompanying drawings and preferred embodiments, is set forth as below to illustrate the implement, structure, features and effects of the subject matter of the present invention.

Referring to FIG. 2 through FIG. 7, according to a preferred embodiment of the present invention, a ball screw with support devices has the construction as described below.

The ball screw comprises a screw 20.

The ball screw comprises a nut 30 that is fixed to one side of a nut base 40 and is mounted around the screw 20.

The ball screw comprises at least one support unit 50. The support unit 50 includes two support devices 51. Each of the support devices 51 has a bush 511 that is fixed to one side of a bush seat 512. The bush 511 is slidably mounted around the screw 20. The two support devices 51 of the support unit 50 are symmetrically arranged at two sides of the nut base 40. The bush seats 512 of the two support devices 51 of the support unit 50 are connected by a link 513 provided therebetween. The link 513 has its two ends fixed to the bush seats 512 of the two support devices 51, respectively. In the embodiment shown in FIG. 2 through FIG. 4, a single said support unit 50 is provided with its two support devices 51 arranged at two sides of the nut base 40. Alternatively, in another the embodiment shown in FIG. 5 through FIG. 7, two said support units 50 are provided and separated by a distance. The support devices 51 of the two support units 50 are symmetrically arranged at two sides of the nut base 40.

The ball screw comprises a speed-controlling unit 60 that includes two runner structures 61, an active connecting element 62 and a plurality of passive connecting elements 63. The runner structure 61 has a foundation 611 on which a driving wheel 612 and driven wheels 613 corresponding to the support unit 50 in terms of number are concentrically installed. The driving wheel 612 has a diameter greater than a diameter of the driven wheels 613. The driving wheel 612 and the driven wheels 613 have a diameter ratio of 2:1 or 3:1. The runner structures 61 are deposited near the two ends of the screw 20. The active connecting element 62 is wound around the driving wheels 612 of the two runner structures 61 and has its two ends fixed to the nut base 40. Each of the passive connecting elements 63 has one end wound around the driven wheel 613, and has an opposite end connected to the bush seat 512. The active connecting element 62 and the passive connecting elements 63 may each be a rope, a belt, or a chain.

The ball screw comprises an auxiliary displacement unit 70, which includes a rail 71 and a plurality of sliders 72. Each of the sliders 72 is slidably mounted on the rail 71. The opposite side of the nut base 40 and the opposite side of each of the bush seats 512 are fixed to one said slider 72, respectively.

With the structural configuration and features described above, in the disclosed ball screw, the nut base 40 works with the nut 30 and the bush seats 512 work with the bushes 511 to stably support the screw 20. Additionally, the two runner structures 61 and the active connecting element 62 and the passive connecting elements 63 connected therebetween jointly allow the support devices 51 to be driven synchronously, so as to maintain reliable supporting effect throughout the travel. The disclosed ball screw has a simple overall structure, so as to moderate the maintenance costs.

In use of the disclosed ball screw, the screw 20 is rotated by an external power source, and in turn drives the nut 30 mounted therearound to perform linear displacement. The displacement of the nut 30 in turn drives the nut base 40 to move, and the nut base 40 further drives the active connecting element 62 connected thereto to act. As a result, the active connecting element 62 rotate the driving wheels 612 on which it is wound. When the driving wheels 612 rotate, the driven wheels 613 concentrically installed with the driving wheels 612 are driven to rotate synchronously. Consequently, the passive connecting elements 63 connected to the driven wheels 613 act synchronously. Since the driving wheels 612 and the driven wheels 613 have different diameters, the active connecting element 62 and the passive connecting elements 63 that are driven by the driving wheels 612 and the driven wheels 613, respectively, have different tangential velocities. In other words, the active connecting element 62 and the passive connecting elements 63 driven by the driving wheels 612 and the driven wheel 613 can drive the nut base 40 and the bush seats 512 to move at different speeds, and can make the nut base 40 and the bush seats 512 to move with proportional speeds. Of course, for meeting the needs of various displacement applications, the diameter ratio between the driving wheel 612 and the driven wheel 613 can be designed as desired.

Figure 2:
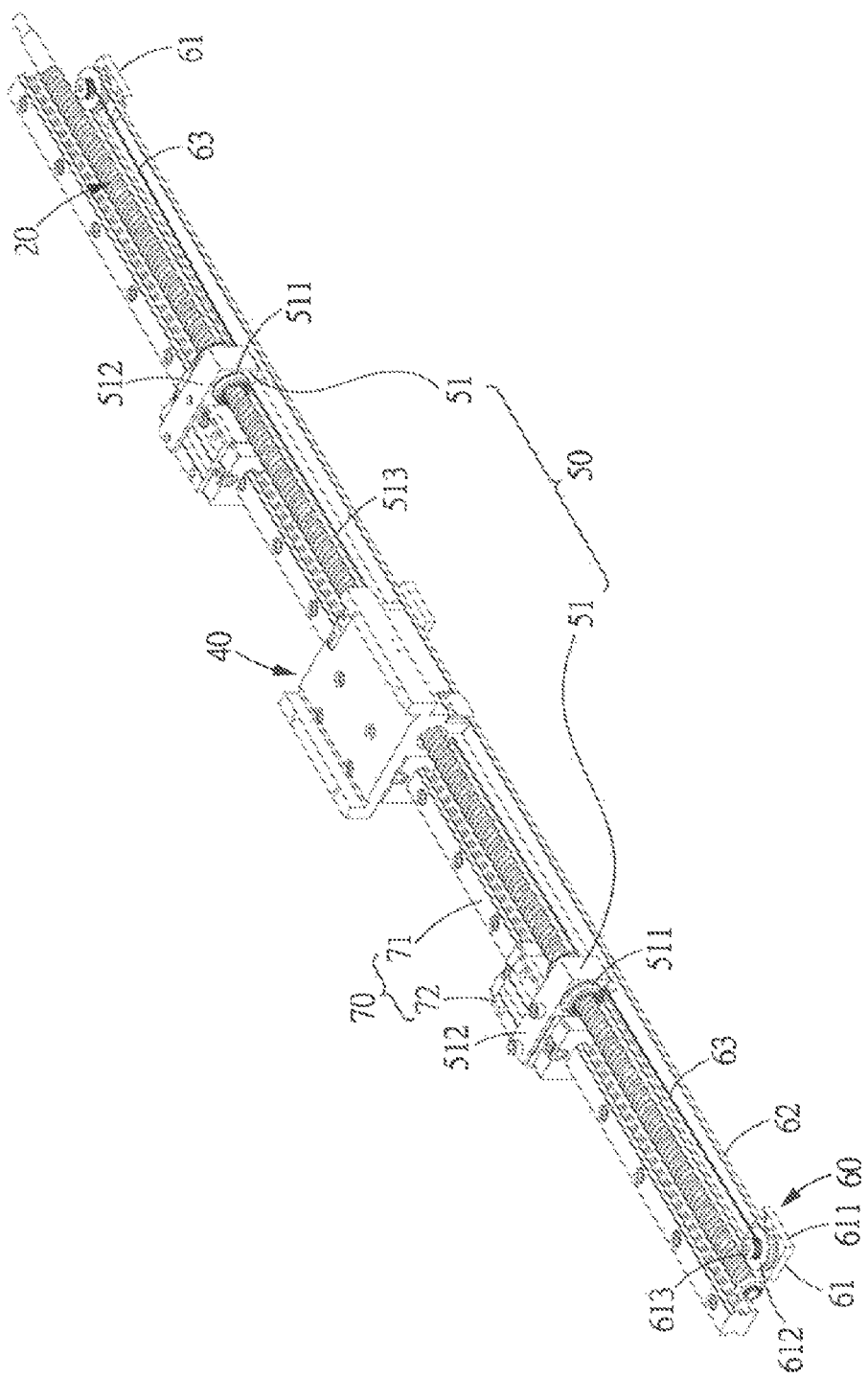
FIG. 2 is a perspective view of a ball screw with support devices according to the present invention, with a support unit provided.
Figure 3:
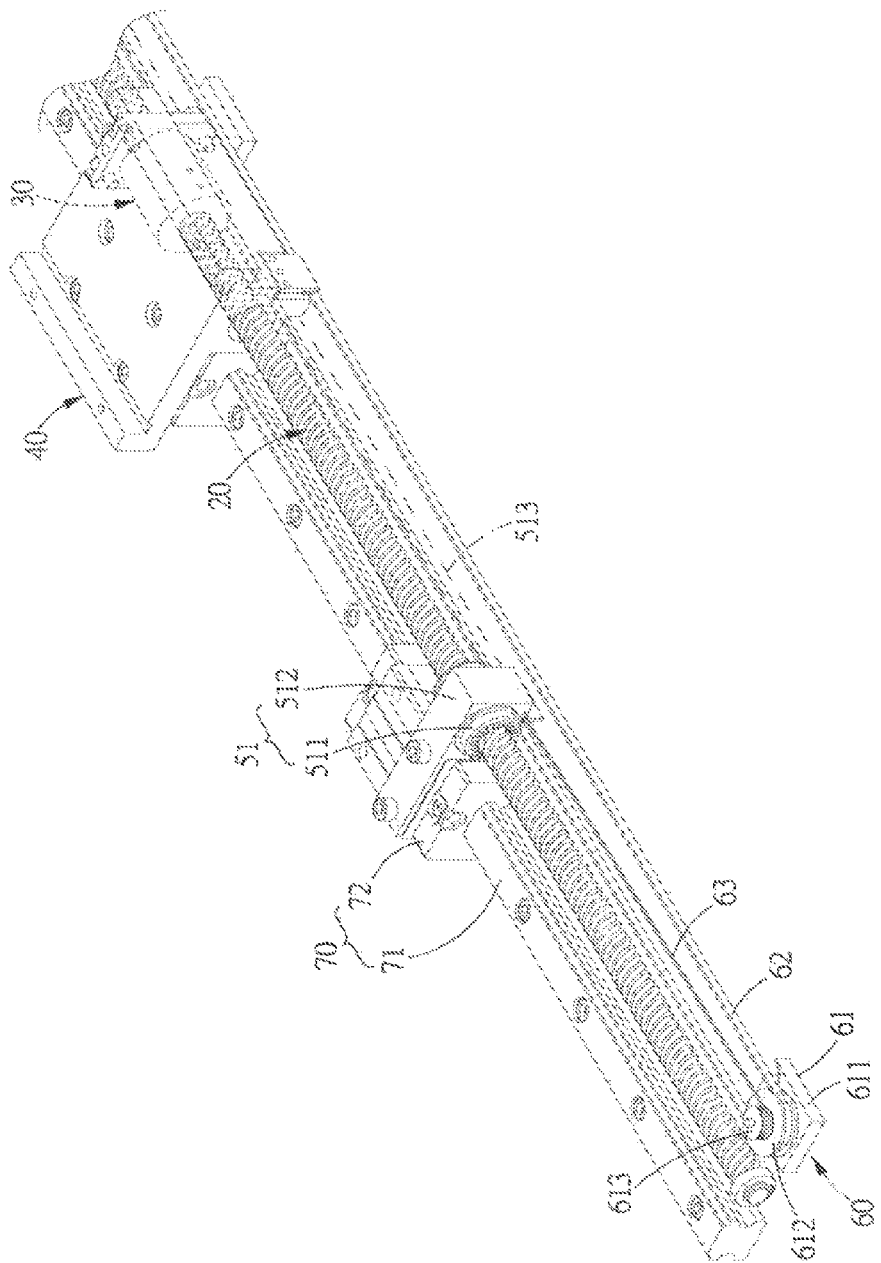
FIG. 3 is a partial, enlarged view of FIG. 2.
Figure 4:
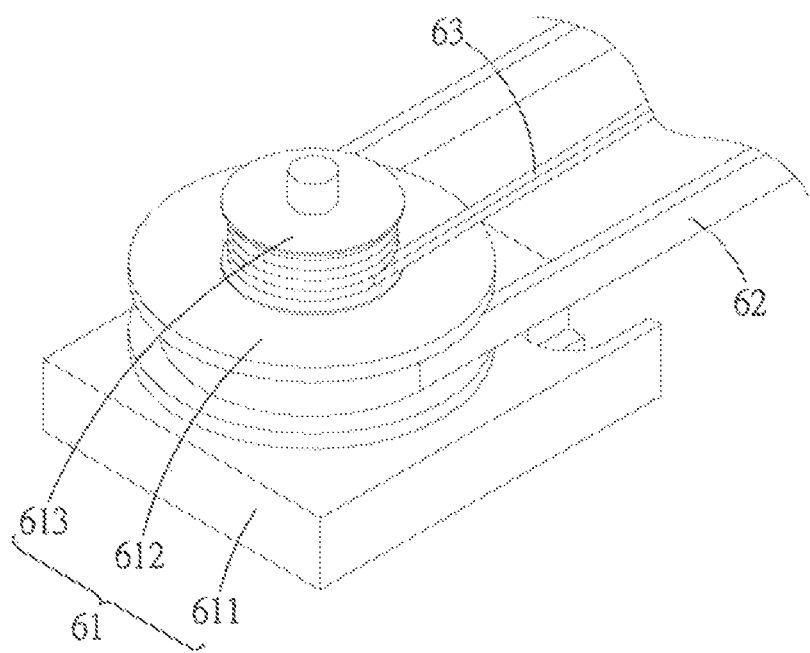
FIG. 4 is a close-up view of the speed-controlling unit of the embodiment of FIG. 2.

In the embodiment of FIG. 2 through FIG. 4, the diameter ratio between the driving wheel 612 and the driven wheel 613 is 2:1. The driving wheels 612 and the driven wheels 613 concentrically rotate to drive the active connecting element 62 and the passive connecting elements 63 to act, and the active connecting element 62 and the passive connecting elements 63 drive the nut base 40 and the bush seats 512 to move in a speed ratio of 2:1. Thereby, the support devices 51 of the support unit 50 can move simultaneously with the nut base 40 at different displacement velocities, so as to ensure that the screw 20 is supported stably and prevented form deflection. As a result, the constant displacement precision of the ball screw is assured.

Figure 8:
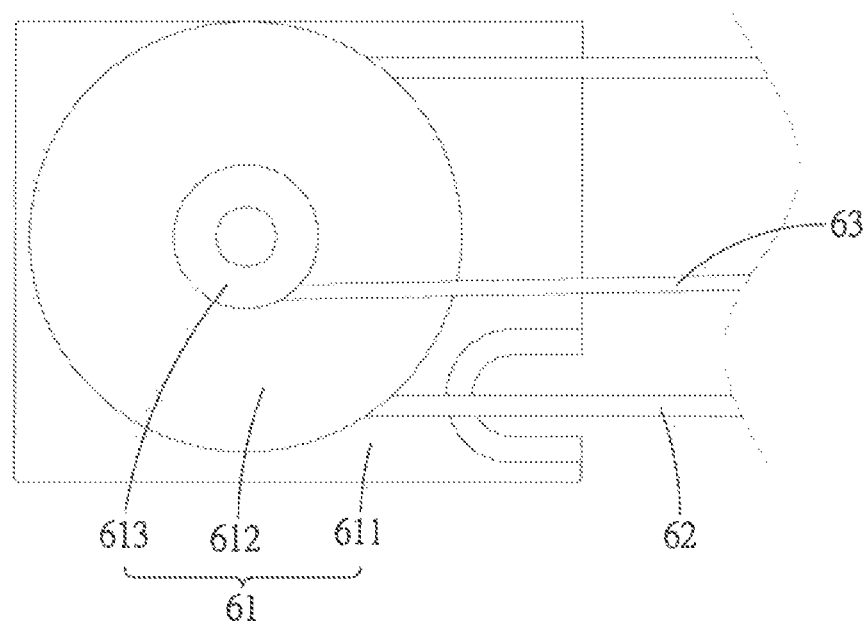
FIG. 8 shows schematically that the driving wheel and the driven wheel of the nut base have a diameter ratio of 3:1.

It is to be noted that when the ratio of the distances from the nut base 40 and the bush seats 512 to one end of the screw 20 changes, the maximum travel of the nut base 40 can remain ensured by changing the diameter ratio between the driving wheel 612 and the driven wheels 613. As shown in FIG. 8, in the embodiment, the diameter ratio between the driving wheel 612 and the driven wheel 613 is changed to 3:1, so the nut base 40 and the bush seats 512 are controlled to move in a speed ratio of 3:1. Due to the differential velocity, the nut base 40 gradually comes close to the bush seats 512 throughout its travel, and when they come to the terminal of the screw 20, the nut base 40 and the bush seats 512 are still separated by a certain distance for safety, thereby ensuring the maximum possible travel of the nut base 40.

Figure 5:
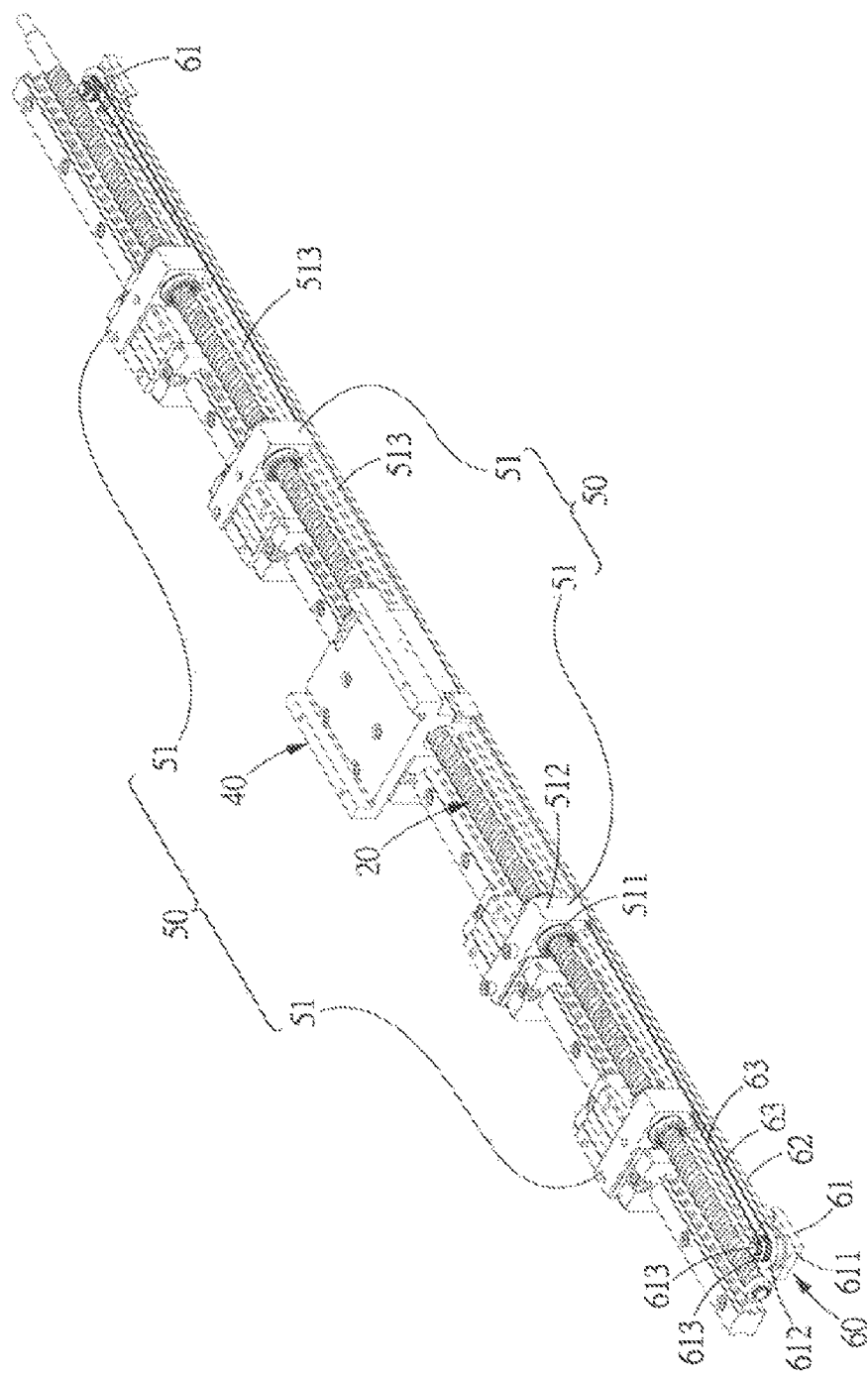
FIG. 5 is a perspective view of a ball screw with support devices according to the present invention, with two support units provided.
Figure 6:
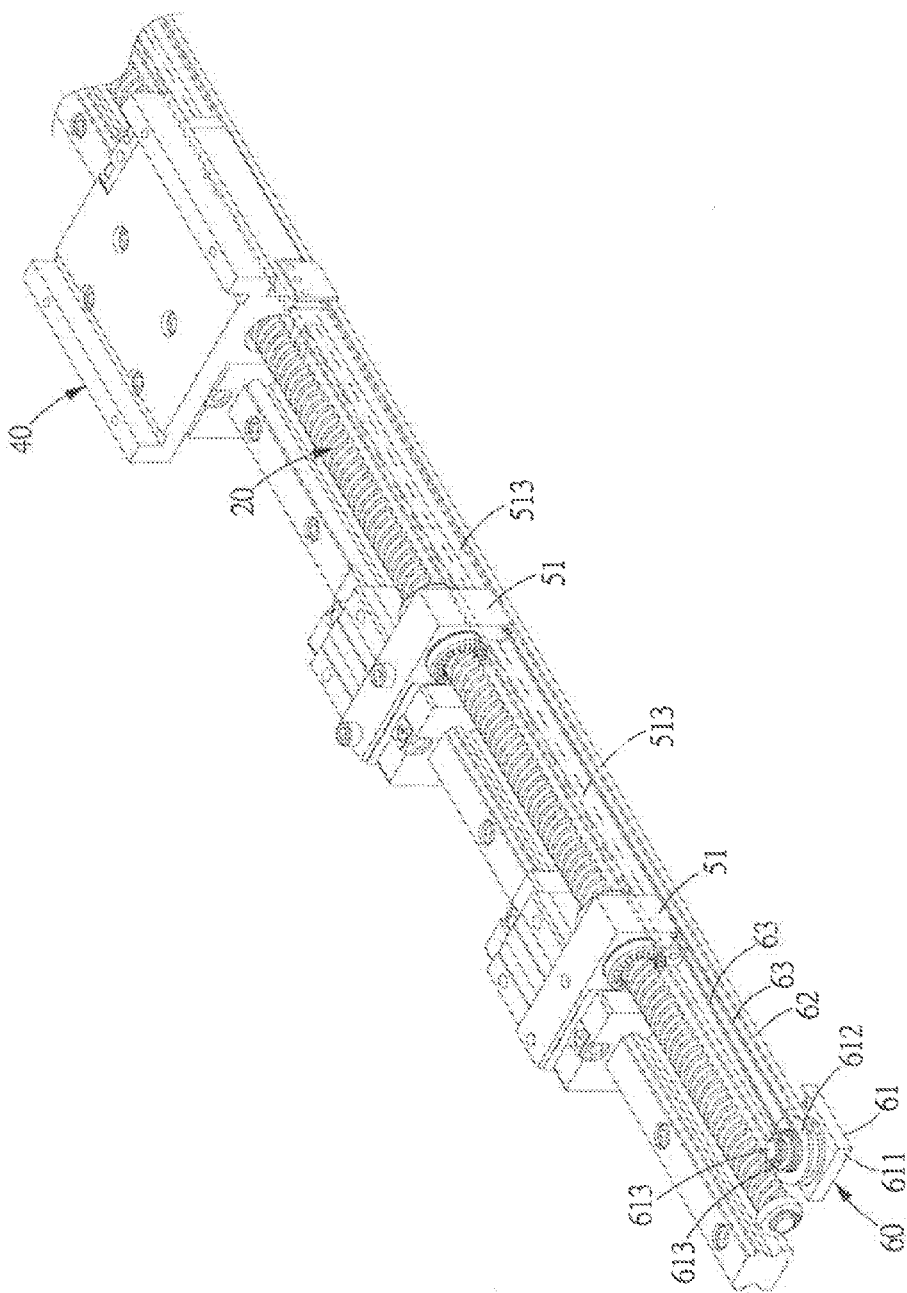
FIG. 6 is a partial, enlarged view of FIG. 5.
Figure 7:
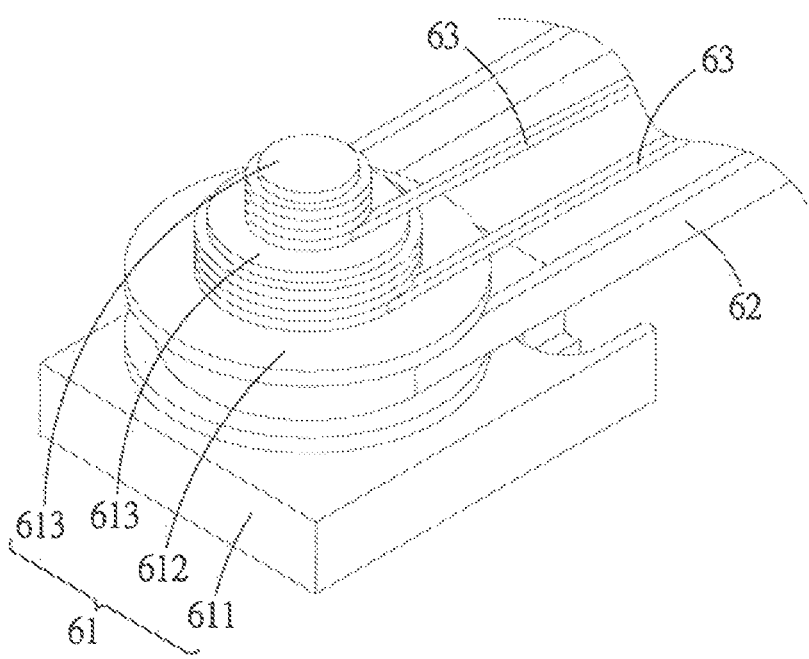
FIG. 7 is a close-up view of the speed-controlling unit of the embodiment of FIG. 5.

When the length of the screw 20 increases, more support units 50 and accordingly more driven wheels 613 of the runner structures 61 can be used to secure the stability of the screw 20. In this case, the diameter ratios between the driving wheel 612 and the driven wheels 613 are decreased progressively. As shown in FIG. 5 through FIG. 7, two support units 50 are used, and in the runner structure 61, two driven wheels 613 are provided. The diameter ratio among the driving wheel 612 and the two driven wheels 613 is 3:2:1. Each of the driven wheels 613 of the two runner structures 61 is connected to the bush seat 512 of the support unit 50 through a passive connecting element 63, and the two support devices 51 of the same support unit 50 are connected by a link 513. With this configuration, the present embodiment can as function as the previous embodiment, and can also ensure reliable support to the nut base 40 throughout its travel, thus contributing to high precision of transmission.

What is claimed is:

1. A ball screw with support devices, comprising:
   a screw;
   a nut, fixed to a nut base and mounted around the screw;
   two support units, each including two said support devices, the support device having a bush that is fixed to a bush seat and is slidably mounted around the screw, wherein the two support devices of each of the support units are symmetrically arranged at two sides of the nut base; and
   a speed-controlling unit, including two runner structures, an active connecting element and a plurality of passive connecting elements, wherein each said runner structure has a foundation on which a driving wheel and two driven wheels are installed concentrically and rotatably, and diameter ratios between the driving wheel and the two driven wheels decrease progressively so that a diameter ratio among the driving wheel and the two driven wheels is 3:2:1, the runner structures being deposited near two ends of the screw, the active connecting element being wound around the driving wheels of the two runner structures and having two ends thereof fixed to the nut base, and the passive connecting element having one end wound around the two driven wheels and an opposite end connected to the bush seat.

2. The ball screw with support devices of claim 1, wherein the nut is fixed to one side of the nut base, and an opposite side of the nut base is fixed to a slider of an auxiliary displacement unit, in which the slider is slidably mounted on a rail.

3. The ball screw with support devices of claim 1, wherein the bush is fixed to one side of the bush seat, and an opposite side of the bush seat is fixed to a slider of an auxiliary displacement unit, in which the slider is slidably mounted on a rail.

4. The ball screw with support devices of claim 1, wherein the bush seats of the two support devices of the same support unit are connected by a link, in which two ends of the link are fixed to the bush seats of the two support devices.

5. The ball screw with support devices of claim 1, wherein each of the active connecting element and the passive connecting elements is a rope, a belt, or a chain.

* * * * *